Dec. 16, 1941.    W. C. MATHEIS    2,266,650
UNIVERSAL JOINT AND SCREW CONVEYER
Filed Aug. 4, 1939    2 Sheets-Sheet 2
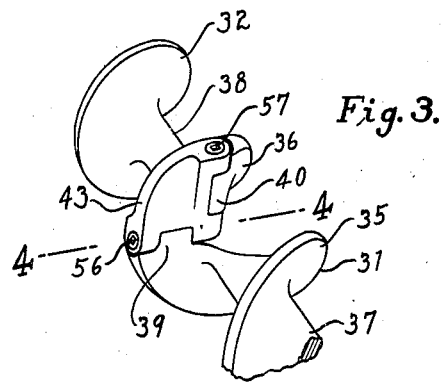
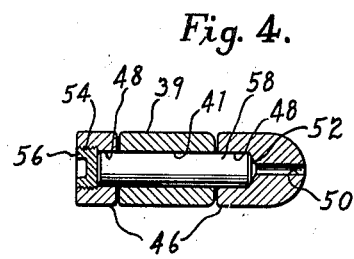
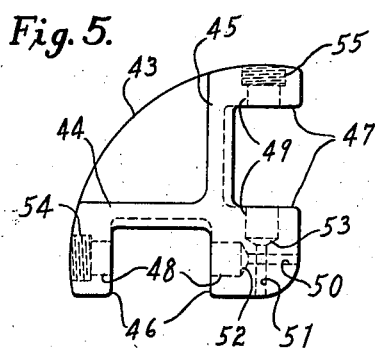
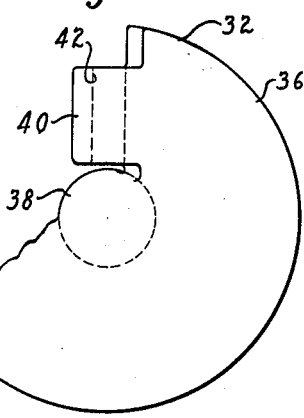
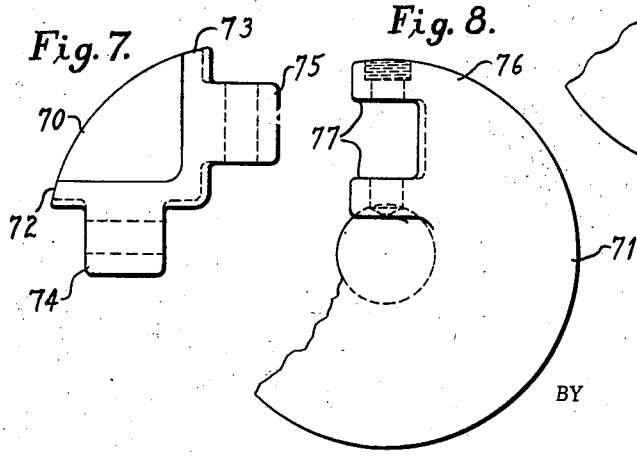
INVENTOR.
WILLIAM C. MATHEIS
BY
ATTORNEY.

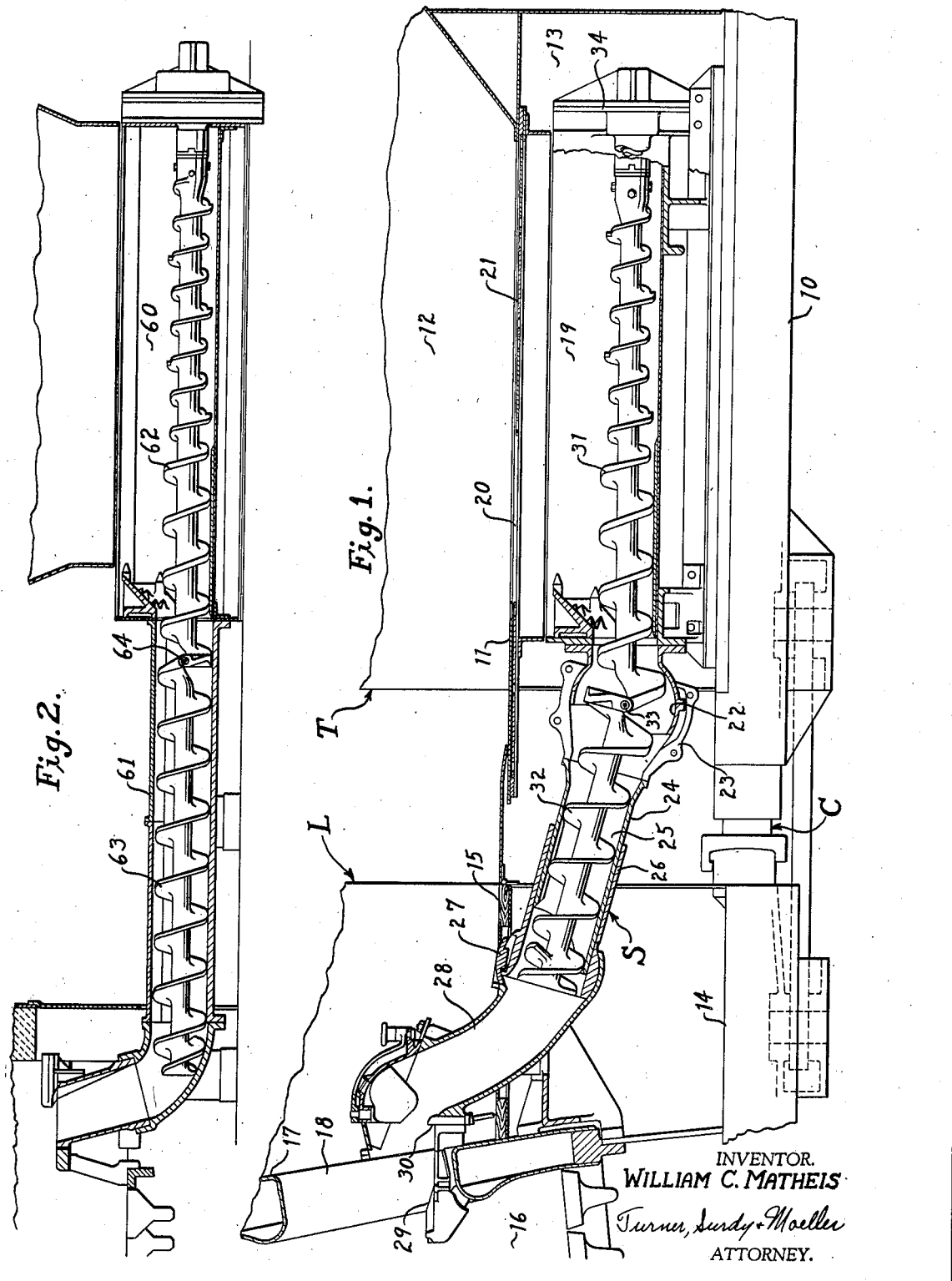

Patented Dec. 16, 1941

2,266,650

UNITED STATES PATENT OFFICE 2,266,650

UNIVERSAL JOINT AND SCREW CONVEYER

William C. Matheis, Erie, Pa., assignor to The Standard Stoker Company, Incorporated, a corporation of Delaware Application August 4, 1939, Serial No. 288,391

18 Claims. (Cl. 198—213)

My invention relates to a novel universal connection between a driving member and a driven member and more particularly to a material conveying means comprising a plurality of conveyer screws provided at their adjacent ends with an improved universal connection.

An object of my invention is to provide a novel conveying means comprising a plurality of universally connected conveyer screws effecting free and continuous movement of material from one conveyer screw to another.

Another object of my invention is to provide an improved universal connection in a screw conveying means that forms with the flights of the conveyer screw sections a continuous material impelling face.

Another object of my invention is to provide an improved universal connection between a driving member and a driven member, specifically a pair of conveyer screws, so constructed as to reduce the wear on the parts thereof, thereby minimizing replacement and repair of the parts thereof.

Still another object of my invention is the provision in a screw conveying means of a novel and improved universal connection having relatively few parts and that is simple in construction, easily assembled with the screw conveying means and that assists the movement of material from one conveyer screw to the other.

With these and other objects in view, which will become apparent as the description proceeds, the invention resides in the construction, combination and arrangement of parts, hereinafter more fully described and claimed, and illustrated in the accompanying drawings, in which Fig. 1 is a longitudinal, vertical, central section through adjacent ends of a locomotive and tender with a stoker applied thereto, parts being shown in elevation, the stoker including a screw conveying means embodying the novel universal joint, the stoker being of the type in which the screw conveyers are normally in disalignment;

Fig. 2 is a view of a stoker of a different type from that shown in Fig. 1 and in which the screw conveyers are normally in alignment, the screw conveying system embodying the same form of novel universal joint as shown in Fig. 1;

Fig. 3 is an isometric view of the adjacent ends of a pair of screw conveyers for a screw conveying system embodying the novel universal joint shown in Figs. 1 and 2;

Fig. 4 is a sectional view taken on the line 4—4 of Fig. 3 in a plane axial to the conveyer screw;

Fig. 5 is a plan view of the coupling member of the novel universal joint;

Fig. 6 is an end view of a screw conveyer, a part thereof being broken away, showing a portion of the novel universal joint formed therewith.

Fig. 7 is a plan view of a modified form of the coupling member of the novel universal joint; and Fig. 8 is an end view of a screw conveyer, a part thereof being broken away, showing a complementary portion of the coupling member of Fig. 7, which together form a modification of the universal joint illustrated in Figs. 1 to 6.

In the drawings, referring to Figs. 1 and 2, the invention is disclosed, for purpose of illustration, as embodied in the conveying system of a stoker for a locomotive and tender. It will be apparent, however, as the description proceeds, that the novel universal connection is equally applicable in various other conveying systems.

Referring specifically to Fig. 1, an intercoupled locomotive and tender are designated by the letters L and T, respectively; and the coupling, designed to allow relative movement between the locomotive and tender as they pass over curving tracks, turntables, switches, etc., is designated by the letter C. The tender T comprises a frame 10, a floor 11 spaced above the frame, a fuel bin 12 and a compartment 13 disposed in the forward central portion of the tender between the frame 10 and the floor 11. The locomotive L includes a frame 14, a cab deck 15 spaced above the frame 14, and a firebox 16 provided with a hollow backwall 17 having a firing opening 18 therein above the level of the cab deck 15.

Fuel is delivered from beneath the fuel bin 12 to the firing opening 18 and projected therefrom into the firebox 16 by a stoker, indicated as a whole by the letter S. The stoker S includes an open mouth trough 19 rigidly mounted on the tender frame 10 in the compartment 13, arranged to receive fuel from the bin 12 through an opening 20 in the floor 11. Delivery of fuel to the trough 19 is preferably controlled by a plurality of plates 21 slidably mounted to cover or uncover desired portions of the opening 20.

At the forward end of the trough 19 is secured one section 22 of a hollow ball joint; the other section 23 thereof being carried by one part 24 of a transfer conduit 25 which extends forwardly and upwardly from the tender to the locomotive. The other part 26, of the transfer conduit 25, is in telescopic engagement with the part 24, the one being adapted to slide freely within the other. The forward end of the transfer conduit 25 is flexibly connected by the ball and socket connection 27 with a fuel delivery nozzle 28. The delivery nozzle 28 communicates with the lower portion of the firing opening 18 and delivers fuel upon a distributor table 29 from which the fuel is projected into the firebox by suitable means, as by a steam blast issuing from a pressure fluid distributor head 30.

Screw conveying means is employed for conveying fuel through the trough 19 and intermediate conduit 25 and for urging it through the delivery nozzle 28 to the firing opening 18. The screw conveying means consists of a screw conveyer 31 mounted in the trough 19 and a screw conveyer 32 housed within the transfer conduit 25, the screw conveyers being flexibly connected within the ball joint 22, 23 by a universal joint 33. The screw conveying means 31, 32, is driven from the rearward end of the screw conveyer 31 through gearing (not shown) in the gear housing 34, the gearing being connected in any desired manner with a source of power.

The screw conveyers 31 and 32, since they are angularly related, and since the housings in which they are mounted are movable angularly with respect to each other as relative movement between the locomotive and tender occurs in rounding curves or passing over turntables, switches etc., are necessarily universally connected. There will now be described an improved universal connection providing easy driving of one screw conveyer through the other and providing free flow of fuel from one to the other regardless of material angularity and relative angular movement between the screw conveyers 31 and 32.

With reference particularly to Fig. 3, it will be seen that the flight portions 35 and 36 of the screw conveyers 31 and 32, respectively, extend slightly beyond the hubs 37 and 38 of the screw conveyers 31 and 32, respectively. The adjacent terminal edges of the flight portions 35 and 36 are provided with the thickened projections 39 and 40 respectively, provided with the bores 41 and 42, respectively, the axes of the bores 41 and 42 being disposed at right angles to and passing through the axes of the screw conveyers 31 and 32, respectively. A coupling member 43 connects the adjacent terminal ends of the flight portions 35 and 36. This coupling member 43 is in the form of a quarter turn of a screw flight, preferably made to the same pitch as the flight portions 35 and 36. The thickened terminal portions 44 and 45 of the coupling member 43 are formed to provide the jaws 46 and 47, respectively. The jaws 46 and 47 are provided with inner bores 48 and 49, respectively, disposed with their axes at right angles with respect to each other; and at one end with the outer bores 50 and 51, respectively, of lesser diameter than the bores 48 and 49, providing the seats 52 and 53, respectively, and at their other ends with the tapped openings 54 and 55, respectively, for receiving the threaded plugs 56 and 57, respectively.

In connecting the screw conveyers 37 and 38, the projections 39 and 40 are arranged to be received in the jaws 46 and 47, respectively. Pins, one of which is shown in Fig. 4 at 58, are received in the inner bore 48 of jaw 46 and bore 41 of projection 39, and inner bore 49 of jaw 47 and bore 42 of projection 40. The threaded plugs 56 and 57 together with the seats 52 and 53 hold the pins 58 in place. The coupling member 43, as best shown in Fig. 3 forms a continuation of the screw flights 35 and 36. This construction provides a joint allowing free universal movement and free passage of material from one screw conveyer to the other.

The invention has been described in connection with a screw conveying system comprising a plurality of screw conveyers that are angularly related. The invention is also advantageously embodied in a long conveyer screw housed in a long conduit, as shown in Fig. 2. In this construction the trough conduit 60 and the tubular conduit 61 are in rigid axial alignment. However, in such a long conduit system, particularly when employed on a moving vehicle, there will be a certain amount of flexure, so that a long unitary screw would bind in the conduit. This condition can be relieved by employing a plurality of screw conveyers 62, 63 connected by a universal joint 64 such as that described above in connection with the preferred form of the invention.

In Figs. 7 and 8 is shown a modification of the coupling member 70 and conveyer screw flight 71 wherein the thickened terminal portions 72 and 73 of the coupling member 70 are provided with the projections 74 and 75, respectively, and the conveyer screw flight 71 at its thickened terminal portion 76 is provided with jaw elements 77 engaging the projection 75 of the coupling member 70. It is of course understood that the other conveyer screw flight (not shown) is constructed the same as the conveyer screw flight 71 and engages the projection 74. In other respects the modified form of the invention is identical with the preferred form of the invention.

From the above description of the invention it is apparent that the novel coupling provides for free passage of fuel from one screw conveyer to the other. Furthermore, since the bearing surfaces of the drive connection are radially distant from the axes of the screw conveyers, the torque and consequently the wear on the pins and the bearing surfaces of the coupling member and the ends of the screw conveyers is reduced, thereby increasing the life of the drive connection and necessitating less frequent repair and replacement of the parts thereof.

I claim:

1. An articulated conveyer comprising a pair of spaced conveyer screws having spirally wound flights, and a coupling member hingedly connected at its opposite ends directly to the adjacent terminal portions of said conveyer screw flights providing articulation between said conveyer screws, the hinged connections being offset with respect to the axes of said conveyer screws and the axes of the hinged connections being at right angles with respect to each other.

2. An articulated conveyer comprising a pair of spaced conveyer screws having spirally wound flights, and a coupling member formed as a portion of a screw flight hingedly connected at its opposite ends directly to the adjacent terminal portions of said conveyer screw flights providing articulation between said conveyer screws.

3. An articulated conveyer comprising a pair of spaced conveyer screws having spirally wound flights, and a coupling member formed as a quarter turn of a screw flight hingedly connected at its opposite ends directly to the adjacent terminal portions of said conveyer screw flights providing articulation between said conveyer screws.

4. An articulated conveyer comprising a pair of spaced conveyer screws having spirally wound flights, and a coupling member formed as a portion of a screw flight having the same pitch as the pitch of said conveyer screw flights, said coupling member being hingedly connected at its opposite ends directly to the adjacent terminal portions of said conveyer screw flights providing articulation between said conveyer screws.

5. An articulated conveyer comprising a pair of spaced conveyer screws having spirally wound flights, and a coupling member formed as a quarter turn of a screw flight having the same pitch as the pitch of said conveyer screw flights, said coupling member being hingedly connected at its opposite ends directly to the adjacent terminal portions of said conveyer screw flights providing articulation between said conveyer screws.

6. An articulated conveyer comprising a pair of spaced conveyer screws having spirally wound flights, and a coupling member formed as a quarter turn of a screw flight hingedly connected at its opposite ends directly to the adjacent terminal portions of said conveyer screw flights providing articulation between said conveyer screws, the axes of said hinged connections being at right angles with respect to each other.

7. An articulated conveyer comprising a pair of spaced conveyer screws having spirally wound flights, and a coupling member formed as a quarter turn of a screw flight hingedly connected at its opposite ends directly to the adjacent terminal portions of said conveyer screw flights providing articulation between said conveyer screws, the axes of said hinged connections being at right angles with respect to each other and passing through the axes of said conveyer screws.

8. An articulated conveyer comprising a pair of spaced conveyer screws having spirally wound flights, and a coupling member formed as a quarter turn of a screw flight having the same pitch as the pitch of said conveyer screw flights, said coupling member being hingedly connected at its opposite ends directly to the adjacent terminal portions of said conveyer screw flights providing articulation between said conveyer screws, the axes of said hinged connections being at right angles with respect to each other.

9. An articulated conveyer comprising a pair of spaced conveyer screws having spirally wound flights, and a coupling member formed as a quarter turn of a screw flight having the same pitch as the pitch of said conveyer screw flights, said coupling member being hingedly connected at its opposite ends directly to the adjacent terminal portions of said conveyer screw flights providing articulation between said conveyer screws, the axes of said hinged connections being at right angles with respect to each other and passing through the axes of said conveyer screws.

10. As an article of manufacture, a coupling member of a universal joint, said coupling member being in the form of a quarter turn of a screw flight having its terminal portions of increased thickness, each of said thickened terminal portions having a bore therein, the axes of said bores intersecting and being at right angles with respect to each other.

11. As an article of manufacture, a coupling member of a universal joint, said coupling member being in the form of a quarter turn of a screw flight having its terminal portions of increased thickness, each of said thickened terminal portions having radially extending bores therein, the axes of said bores being at right angles with respect to each other and lying in a common plane perpendicular with respect to the axis of said screw flight.

12. As an article of manufacture, a coupling member of a universal joint, said coupling member being in the form of a quarter turn of a screw flight having its terminal portions forked to form jaws, each of said jaws having radially extending bores therein, the axes of said bores intersecting and being at right angles with respect to each other.

13. As an article of manufacture, a coupling member of a universal joint, said coupling member being in the form of a quarter turn of a screw flight having its terminal portions of increased thickness, each of said thickened terminal portions having a projection between its respective inner and outer end extending in the direction of the screw flight, each of said projections having radially extending bores therein, the axes of said bores intersecting and being at right angles with respect to each other.

14. As an article of manufacture, a screw conveyer having a hub and a spirally wound flight thereon, said spirally wound flight extending beyond the end of said hub and having its terminal portion of increased thickness, said thickened terminal portion having a radially extending bore therein, the axis of said bore being at right angles with respect to and intersecting the extended axis of said screw conveyer.

15. As an article of manufacture, a screw conveyer having a hub and a spirally wound flight thereon, said spirally wound flight extending beyond the end of said hub and having a projection formed on its terminal portion, said projection having a radially extending bore therein, the axis of said bore being at right angles to and intersecting the extended axis of said screw conveyer.

16. An articulated conveyer comprising a pair of spaced conveyer screws having spirally wound flights, and a coupling member formed as a quarter turn of a screw flight connecting adjacent ends of said conveyer screws, said coupling member having a jaw formed at each of its terminal portions, each of said conveyer screws having a projection formed at the adjacent terminal portions of their spirally wound flights, one of said projections being engaged by one of said jaws and the other of said projections being engaged by the other of said jaws and means associated with said engaged projections and jaws forming hinged connections, the axes of said hinged connections being at right angles with respect to each other.

17. An articulated conveyer comprising a pair of spaced conveyer screws having spirally wound flights, and a coupling member formed as a quarter turn of a screw flight connecting adjacent ends of said conveyer screws, said coupling member having a projection formed at each of its terminal portions, each of said conveyer screws having a jaw formed at the adjacent terminal portions of their spirally wound flights, one of said projections being engaged by one of said jaws and the other of said projections being engaged by the other of said jaws, and means associated with said engaged projections and jaws forming hinged connections, the axes of said hinged connections being at right angles with respect to each other.

18. An articulated conveyer comprising a pair of spaced conveyer screws having spirally wound flights and a coupling member formed as a portion of a screw flight hingedly connected at its opposite ends directly to the adjacent terminal portions of said conveyer screw flights providing articulation between said conveyer screws, the axes of the hinged connections lying in a common plane and being at right angles with respect to each other.

WILLIAM C. MATHEIS.